Sept. 8, 1959         A. R. WELLS              2,903,664
                     VOLTAGE CONTROL
                    Filed Oct. 28, 1957
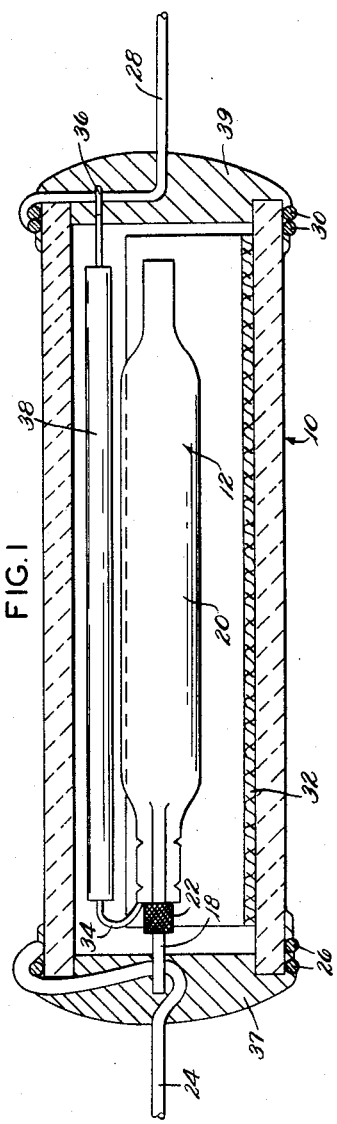
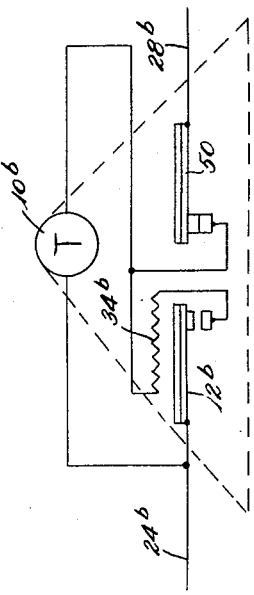
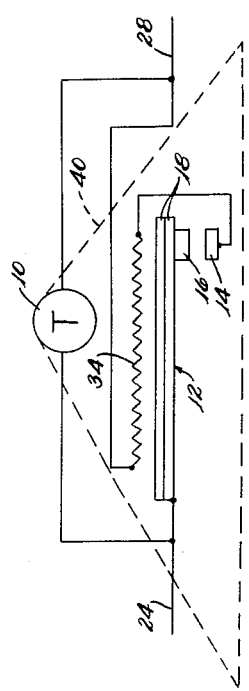
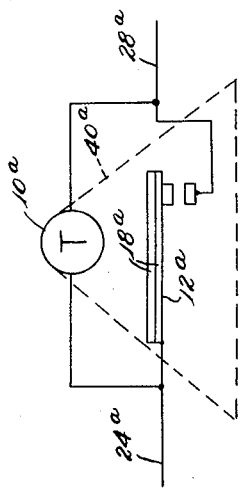
*INVENTOR.*
ALTON R. WELLS
BY
Oldham & Oldham
ATTYS.

United States Patent Office 2,903,664
Patented Sept. 8, 1959

2,903,664

VOLTAGE CONTROL

Alton R. Wells, Akron, Ohio

Application October 28, 1957, Serial No. 692,839

6 Claims. (Cl. 338—23)

This invention relates to voltage controls, and more particularly, is concerned with units of this type adapted to be positioned between an electrically operated mechanism and the line voltage so that when the mechanism is first connected to the line only a selected fraction of the line voltage is applied to the mechanism, the unit functioning to gradually increase the applied voltage until full line voltage is applied.

It has been proposed heretofore to utilize resistances of negative coefficient of the so-called thermistor type between an electric appliance and a line voltage to prevent the full line voltage from being applied to the appliance when first connected, the voltage progressively increasing as the resistance heats and its resistance lowers. However, known voltage control units are open to the objection that they are not compact and self-contained in construction, have often required a separate case and mounting means, are subject to fire underwriters objection by overheating, or are comparatively expensive.

It is the general object of my invention to avoid and overcome the foregoing and other difficulties of and objections to prior art practices by the provision of a relatively simple, inexpensive, voltage control unit characterized by compactness of size, safety in use, inexpensiveness of manufacture, and long life.

The foregoing objects of my invention, and other objects which will become apparent as the description proceeds, are achieved by the combination in a voltage control of a tubular thermistor, a normally open thermostat positioned inside the thermistor, means electrically connecting the thermostat to shunt the thermistor when the thermostat is closed, and electric leads connected to the ends of the thermistor. Means are usually provided for sealing closed the ends of the thermistor, and a keeper wire may be connected in series with the thermostat to constitute a heating means adapted to maintain the thermostat closed as long as the load is on. Also, a normally closed thermostat may be positioned inside the thermistor as a safety thermostat and connected in series with one of the electric leads so as to entirely open the circuit should the first thermostat fail for any reason to operate.

For a better understanding of the invention, reference should be had to the accompanying drawings wherein Fig. 1 is a longitudinal vertical sectional view on an enlarged scale of one typical embodiment of the principles of the invention;

Fig. 2 is a diagrammatic wiring diagram of the embodiment of the invention shown in Fig. 1;

Fig. 3 is a view similar to Fig. 2 but illustrating a modification of the invention of Figs. 1 and 2; and Fig. 4 is a view similar to Fig. 2 but illustrating still another form of the invention.

In the drawings, and particularly having reference to the form of the invention shown in Figs. 1 and 2, the numeral 10 indicates generally a tubular thermistor. This thermistor is a negative type resistance material known in the electrical art to possess the characteristic of having decreased electric resistance as it heats. Positioned inside the tubular thermistor 10 is a thermostat 12 of the reverse action type, that is, of the type in which the contacts 14 on the case and 16 on the bimetal 18 close on a rise in temperature, the exact point of closing being calibrated, for example, to close from between about 30% to 90% of full load. The end of the bimetal 18 extends out of the case 20 of the thermostat and is insulated therefrom by a sleeve 22 of insulation, all in accord with the construction illustrated in U.S. Patent No. 2,497,397. The bimetal 18 is electrically connected to a lead wire 24 extending substantially axially of the thermistor 10, the end of the wire 24 being wrapped around the end of the tubular thermistor 10, as at 26, to provide an electrical connection as by soldering with the end of the thermistor 10.

A second lead wire 28 extending substantially axially of the thermistor 10 at its other end likewise has its end wrapped around the end of the thermistor 10, as at 30, and is electrically secured thereto as by soldering.

In order to prevent the thermostat 12 from engaging with the inner surface of the thermistor 10, a strip 32 of material is provided between the thermostat 12 and the inside of the thermistor 10, this material, such as asbestos or fibreglass cloth being an electric insulator and adapted to not deteriorate under the heat conditions encountered.

The thermostat 12 is connected in shunt relation with the thermistor 10, and to this end, a wire lead 34 extends from the case 20 of the thermostat to the electric lead 28 being secured thereto at 36. A tube 38 of electric insulating material covers the wire 34 and prevents it from engaging electrically with the inside of the thermistor 10.

By making the wire 34 optionally of Nichrome or other resistance material, the wire 34 serves as a keeper to keep the contacts 14 and 16 of the thermostat 12 closed once the thermostat has been brought up to a temperature to close the contacts.

The ends of the voltage control unit of Fig. 1 are preferably sealed, and this is best accomplished by dipping the ends of the assembled unit into ceramic solder cement to form a disc 37 and a disc 39 at the ends of the unit. These discs intimately bond with the solder covered ends of the thermistor holding the wire turns 26 and 30 in place and with the leads 24 and 28.

Referring more particularly to Fig. 2, it is clearly evident that the keeper wire 34 and the contacts 14 and 16 and bimetal 18 of the thermostat 12 are in series with each other, but are in shunt relation with the thermistor 10. The dotted line 40 of Fig. 2 merely indicates diagrammatically the tubular contour of the thermistor 10 with the line 40 drawn to surround the keeper wire 34 and all portions of the thermostat 12.

In the operation of the voltage control unit of Figs. 1 and 2, this unit is normally connected in series with an electric appliance, lights, or mechanism, for example, an electric motor. When the voltage is first applied to the control unit, and with contacts 14 and 16 open, all of the current passes through thermistor 10 from lead 24 to lead 28. The thermistor 10 acts to cut the line voltage from say the standard 110 volt current supplied by the main to a 40 to 50 volt current so that the shock of instantaneous full current and voltage on the electric mechanism is avoided and a slow warm-up period is provided. The current flowing through the thermistor 10 heats it and as the temperature of the thermistor increases its resistance drops and more voltage and current steadily passes through the thermistor to lead 28 to gradually increase the voltage and current to the mechanism.

Positioned internally of the thermistor 10, the thermostat 12 receives an application of heat from all sides, the bimetal 18 begins to respond and under the increase in heat, moves contact 16 into engagement with contact 14 to thereby shunt out thermistor 10, and with substantially all electric current now flowing from lead 24 through thermostat 12, wire 34 and to electric lead 28 inasmuch as the resistance of this path of flow is very much less than that through the thermistor. Although the resistance of wire 34 is relatively low, the resistance is sufficiently great so that the wire heats up generating enough heat, positioned as it is adjacent to the bimetal 18 of the thermostat 12 so as to keep the bimetal bent and the contacts 16 and 14 of the thermostat 12 together to thereby to continue full line voltage from lead 24 to lead 28. Once the electric appliance is cut off by its normal on-off switch, the flow of electric current through wire 34 is discontinued, the bimetal 18 returns to its ambient position opening contacts 14 and 16 and the apparatus is ready to operate again in the manner described.

The form of the invention shown in Fig. 3 of the drawings is similar to that already described, and hence like numerals will be used except that the suffix "a" is added. The keeper wire 34 is not present in this embodiment of the invention and the normally-open, reverse-action thermostat 12a is shunted directly across the thermistor 10a. The thermostat 12a is positioned inside the tubular thermistor, the tubular thermistor 10a surrounding the thermostat 12a as indicated diagrammatically by the dotted line 40a.

The embodiment of Fig. 3 of the invention can work in one of several ways. When the unit is connected between line and appliance, voltage from lead 24a normally passes through thermistor 10a to lead 28a with the thermostat 12a open. As the heat builds up in the thermistor 10a and its resistance gradually decreases, the heat is transmitted internally of the thermistor to the thermostat 12a to close the contacts thereof and shunt out the thermistor 10a so that full line voltage is applied between lead 24a and lead 28a.

In the first manner of operating, the bimetal 18a of the thermostat can be made of a cross-section and composition so that the passage of electric current therethrough generates sufficient heat to keep the bimetal bent and the contacts of the thermostat closed as long as an electric appliance or mechanism is connected to the output lead 28a. Of course, turning off the electric appliance cuts off the flow of electric current through the bimetal 18 and returns the parts to initial operating position.

In the second manner of operation of the form of the invention of Fig. 3, the bimetal 18a of the thermostat 12a is not made of a cross-section so that it heats due to the carrying of current therethrough, in which event after the shunting out of the thermistor 10a, the bimetal 18a will gradually cool opening up the thermostat 12a and returning the flow of electric current through the thermistor 10a causing the bimetal 18a to again heat and close the thermostat 12a, etc., so that a gradual on and then complete off cycling action is obtained to give interesting and desirable advertising or illumination effects.

The embodiment of the invention shown in Fig. 4 is generally similar to that illustrated in Figs. 1 and 2, and, accordingly, like numerals are employed except that the suffix "b" has been added. The electric lead 24b connects through thermistor 10b to the output lead 28b, a reverse-action, normally-open thermostat 12b and a keeper wire 34b being connected in shunt relation with the thermistor 10b. A normal-action thermostat 50 having normally-closed contacts is connected in series with the lead 28b of the unit. The thermostat 12b, the keeper wire 34b and the thermostat 50 all being positioned internally of the tubular thermistor 10b and surrounded thereby in the manner indicated by the dotted line 40b.

In this form of the invention, the thermostat 12b, keeper wire 34b and thermistor 10b, all function in exactly the same manner as those illustrated in Fig. 2 with the thermostat 12b shunting out thermistor 10b when a certain temperature, for example, 150° F. is reached by the thermostat 12b. The thermostat 50 is set to open at say 200° F. so that in the normal operation of the unit of Fig. 4, with the thermostat 12b and thermistor 10b functioning correctly, the thermostat 50 is never open. If, however, the thermostat 12b would fail to close for some reason and would not shunt out the thermistor 10b as the temperature of the thermistor 10b continues to climb up to a temperature which would begin to get dangerous from a fire hazard standpoint, then the thermostat 50 opens to entirely break the circuit and eliminates the fire hazard.

While in accord with the patent statutes, certain best known embodiments of the invention have been illustrated and described in detail, it is to be specifically understood that the invention is not limited thereto or thereby, but that its scope is defined in the appended claims:

I claim:

1. A voltage control comprising a tubular thermistor providing an outer casing, a normally open thermostat positioned entirely within the thermistor substantially axially thereof, the thermostat including a metal case, a bimetal strip insulated from the case, carried therein, and having one end extending therefrom, a layer of heat resistant fibrous material electrically insulating one side of the thermostat from the thermistor, an electric lead extending substantially axially of the thermistor from beyond the end thereof into electric contact with the bimetal strip of the thermostat and then wrapped around the end of the thermistor, a disc of ceramic material closing the end of the thermistor and secured to the electric lead, the end of the bimetal strip, and to the end of the thermistor, a heat transmitting resistance wire extending from the case of the thermostat near the exposed end of the bimetal strip and along the side of the thermostat in heat transmitting relation thereto opposite to the heat resistant material, a tube of heat resistant electric insulating material covering said resistance wire, a lead wire extending substantially axially of the thermistor from beyond the other end thereof into electrical contact with the restance wire and then wrapped around said other end of the thermistor, and a disc of ceramic material closing said other end of the thermistor and secured to the lead wire, the end of the resistance wire and to said other end of the thermistor.

2. A voltage control comprising a tubular thermistor providing an outer casing, a normally open thermostat positioned inside the thermistor substantially axially thereof, the thermostat including a metal case, a bimetal strip insulated from the case carried therein, and having one end extending therefrom, a layer of heat resistant fibrous material electrically insulating one side of the thermostat from the thermistor, an electric lead extending from beyond the end of the thermistor into electric contact with the bimetal strip of the thermostat and then wrapped around the end of the thermistor, a disc of ceramic material closing the end of the thermistor and secured to the electric lead, the end of the bimetal strip, and to the end of the thermistor, a heat transmitting Nichrome resistance wire extending from the case of the thermostat near the exposed end of the bimetal strip and along the side of the thermostat in heat transmitting relation thereto opposite to the heat resistant material, a tube of heat resistant electric insulating material covering said resistance wire, a lead wire extending from beyond the other end of the thermistor into electrical contact with the resistance wire and then wrapped around said other end of the thermistor, and a disc of ceramic material closing said other end of the thermistor and secured to the lead wire, the end of the resistance wire and to said other end of the thermistor.

3. A voltage control comprising a tubular thermistor providing an outer casing, a normally open thermostat positioned inside the thermistor substantially axially thereof, the thermostat including a metal case, a bimetal strip insulated from the case carried therein, and having and having one end extending therefrom, a layer of heat resistant fibrous material electrically insulating one side of the thermostat from the thermistor, an electric lead extending from beyond the end of the thermistor into electric contact with the bimetal strip of the thermostat and then connected to the end of the thermistor, ceramic-like material closing the end of the thermistor and secured to the electric lead, the end of the bimetal strip, and to the end of the thermistor, a heat transmitting Nichrome resistance wire extending from the case of the thermostat near the exposed end of the bimetal strip and along the side of the thermostat in heat transmitting relation thereto opposite to the heat resistant material, a tube of heat resistant electric insulating material covering said resistance wire, a lead wire extending from beyond the other end of the thermistor into electrical contact with the resistance wire and then connected to said other end of the thermistor and ceramic-like material closing said other end of the thermistor, and secured to the lead wire, the end of the resistance wire and to said other end of the thermistor.

4. A voltage control comprising a tubular thermistor providing a conductive outer casing, a normally open thermostat positioned inside the thermistor substantially axially thereof, the thermostat including a metal case, a bimetal strip insulated from the case, carried therein, and having one end extending therefrom, an electrtic lead extending from beyond the end of the thermistor into electric contact with the bimetal strip of the thermostat and then connected to the end of the thermistor, ceramic-like material closing the end of the thermistor and secured to the electric lead, the end of the bimetal strip, and to the end of the thermistor, a heat transmitting Nichrome resistance wire extending from the case of the thermostat near the exposed end of the bimetal strip and along the side of the thermostat and in heat transmitting relation to the thermostat, a lead wire extending from beyond the other end of the thermistor into electrical contact with the resistance wire and then connected to said other end of the thermistor, and ceramic-like material closing said other end of the thermistor and secured to the lead wire, the end of the resistance wire and to said other end of the thermistor.

5. The combination in a voltage control of a tubular conductive thermistor element providing an outer casing, a normally open thermostat and a resistance heater wire connected in series and positioned inside of the thermistor, means electrically connecting the thermostat and heater wire to shunt the thermistor when the thermostat is closed, said heater wire being positioned adjacent the thermostat so that the heat from the wire with current passing therethrough will keep the thermostat closed, electric leads connected to the ends of the thermistor and means sealing closed the ends of the thermistor.

6. The combination in a voltage control of a tubular conductive thermistor providing an outer casing, a normally open thermostat and a heater wire connected in series and positioned inside of the thermistor, means electrically connecting the thermostat and wire to shunt the thermistor when the thermostat is closed, said heater wire being positioned adjacent the thermostat so that the heat from the wire with current passing therethrough will keep the thermistor closed, electric leads connected to the ends of the thermistor, and a normally closed thermostat positioned inside the thermistor and connected in series with one of said electric leads.

References Cited in the file of this patent

UNITED STATES PATENTS

| 1,597,719 | Burnham | Aug. 31, 1926 |
| 1,806,796 | Gates | May 26, 1931 |
| 2,455,186 | McCormick | Nov. 30, 1948 |
| 2,497,397 | Dales | Feb. 14, 1950 |